(12) United States Patent
Ansley et al.

(10) Patent No.: US 11,622,278 B2
(45) Date of Patent: Apr. 4, 2023

(54) WIRELESS ACCESS CBRS NODE AND SPECTRUM ACCESS SYSTEM INTERFACE

(71) Applicant: ARRIS Enterprises LLC, Suwanee, GA (US)

(72) Inventors: Carol J. Ansley, Johns Creek, GA (US); Stan Brovont, Milton, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 350 days.

(21) Appl. No.: 16/359,509

(22) Filed: Mar. 20, 2019

(65) Prior Publication Data

US 2020/0305004 A1  Sep. 24, 2020

(51) Int. Cl.
*H04W 72/00* (2009.01)
*H04W 16/14* (2009.01)
*H04L 12/28* (2006.01)
*H04L 41/5019* (2022.01)

(52) U.S. Cl.
CPC ......... *H04W 16/14* (2013.01); *H04L 12/2801* (2013.01); *H04L 41/5019* (2013.01)

(58) Field of Classification Search
CPC ............. H04W 16/14; H04W 28/0263; H04W 72/1268; H04W 72/1273; H04W 76/18; H04L 12/2801; H04L 41/5019
See application file for complete search history.

(56) References Cited

U.S. PATENT DOCUMENTS

| | | | | |
|---|---|---|---|---|
| 8,055,295 B1* | 11/2011 | Khanka | ................ | H04W 72/06 455/103 |
| 8,406,768 B1* | 3/2013 | Khanka | ................ | H04L 5/0035 455/434 |
| 9,131,410 B2* | 9/2015 | Gupta | ............... | H04W 36/0011 |
| 9,681,367 B2* | 6/2017 | Hassan | ............ | H04W 72/0453 |
| 10,231,245 B1* | 3/2019 | Wang | .................... | H04W 72/06 |
| 10,405,192 B2* | 9/2019 | Kakinada | .............. | H04W 16/14 |
| 10,492,204 B2* | 11/2019 | Kakinada | ............ | H04W 72/048 |
| 10,536,859 B2* | 1/2020 | Gunasekara | .......... | H04W 16/14 |
| 11,190,232 B2* | 11/2021 | Kakinada | ............. | H04B 1/7136 |
| 2009/0323608 A1* | 12/2009 | Adachi | ................. | H04W 48/18 370/329 |

(Continued)

OTHER PUBLICATIONS

International Search Report and Written Opinion, PCT/US2020/016478, dated Sep. 9, 2020.

*Primary Examiner* — Amancio Gonzalez
(74) *Attorney, Agent, or Firm* — Steven Stupp; Stewart Wiener

(57) ABSTRACT

An example method includes requesting a first spectrum channel authorization to utilize a first spectrum channel from a spectrum access system. The method further includes accepting a first spectrum channel authorization response to utilize the first spectrum channel from the spectrum access system. The method additionally includes receiving a first service request from a first computing device over the first spectrum channel. The method still further includes sending a first heartbeat message to the spectrum access system. The method furthermore includes receiving a first heartbeat response message from the spectrum access system. The method yet further includes sending a first service flow request from the broadband access network to accommodate the first service request.

20 Claims, 7 Drawing Sheets

(56) References Cited

U.S. PATENT DOCUMENTS

| | | | |
|---|---|---|---|
| 2010/0115099 A1* | 5/2010 | Gu | H04L 12/1881 |
| | | | 709/226 |
| 2012/0005360 A1* | 1/2012 | Li | H04L 12/281 |
| | | | 709/230 |
| 2012/0047273 A1* | 2/2012 | Ajero | H04L 65/80 |
| | | | 709/228 |
| 2014/0119195 A1* | 5/2014 | Tofighbakhsh | H04W 72/048 |
| | | | 370/241 |
| 2014/0253295 A1* | 9/2014 | Roberts | H04M 1/7253 |
| | | | 340/10.5 |
| 2015/0295832 A1* | 10/2015 | Cotter | H04L 47/127 |
| | | | 370/235 |
| 2015/0312824 A1* | 10/2015 | Thalanany | H04W 36/165 |
| | | | 455/435.1 |
| 2015/0351147 A1* | 12/2015 | Jain | H04L 65/104 |
| | | | 370/329 |
| 2017/0055193 A1 | 2/2017 | Mueck | |
| 2017/0332417 A1* | 11/2017 | Tenny | H04W 16/28 |
| 2018/0115908 A1 | 4/2018 | Wang | |
| 2018/0310334 A1* | 10/2018 | Mukherjee | H04L 5/0053 |
| 2019/0058999 A1* | 2/2019 | Gunasekara | H04W 36/0022 |
| 2019/0075055 A1* | 3/2019 | Esserman | H04L 47/11 |
| 2019/0075586 A1* | 3/2019 | Xu | H04W 72/1284 |
| 2019/0364565 A1* | 11/2019 | Hmimy | H04W 72/0453 |

* cited by examiner

| | | | |
|---|---|---|---|
| | | | 3700MHZ |
| | GENERAL ACCESS CHANNELS 365 | | 3650MHZ |
| | • • • • • • • • • • • • • • • | | |
| | PRIORITY ACCESS CHANNEL 15 | 364 | 3640MHZ |
| | PRIORITY ACCESS CHANNEL 14 | 363 | 3630MHZ |
| | PRIORITY ACCESS CHANNEL 13 | 362 | 3620MHZ |
| | PRIORITY ACCESS CHANNEL 12 | 361 | 3610MHZ |
| | PRIORITY ACCESS CHANNEL 11 | 360 | 3600MHZ |
| | PRIORITY ACCESS CHANNEL 10 | 359 | 3590MHZ |
| | PRIORITY ACCESS CHANNEL 9 | 358 | 3580MHZ |
| 3.5G BAND 300 | PRIORITY ACCESS CHANNEL 8 | 357 | 3570MHZ |
| | PRIORITY ACCESS CHANNEL 7 | 356 | 3560MHZ |
| | PRIORITY ACCESS CHANNEL 6 | 355 | 3550MHZ |
| | PRIORITY ACCESS CHANNEL 5 | 354 | 3540MHZ |
| | PRIORITY ACCESS CHANNEL 4 | 353 | 3530MHZ |
| | PRIORITY ACCESS CHANNEL 3 | 352 | 3520MHZ |
| | PRIORITY ACCESS CHANNEL 2 | 351 | 3510MHZ |
| | PRIORITY ACCESS CHANNEL 1 | 350 | 3500MHZ |
| | | | 3499MHZ |
| COUNTY N + 1 314 | COUNTY N 315 | | COUNTY N -1 316 |

FIG. 3

WIRELESS ACCESS CBRS NODE AND SPECTRUM ACCESS SYSTEM INTERFACE

TECHNICAL FIELD

The examples described herein, in general, are related to techniques and equipment used in management of network connections over a Citizens Broadband Radio Service (CBRS) band, typically embedded in a wireless access node, connected to a larger network with access to multiple communication radio bands.

BACKGROUND

The FCC has managed radio frequency usage in the United States since the abolition of the Federal Radio Commission in 1934. Their mission in this regard is to fairly divide up limited radio bandwidth between the needs of the U.S. government and military, special interests such as satellite communications, and citizen usage. To that end, the FCC reserves certain radio bands for government and military usage, grants private entities radio band licenses should they show need, and frees remaining bandwidth to be used by the general population, often with restrictions.

Some private entities include cellular telephony providers, who, for example, have been granted access to utilize sections of the 700 MHz band in order to provide cell phone service to customers. Other bands are currently available for the general public to use for wireless local area networking, or Wi-Fi®, such as the 2.4 GHz and 5.0 GHz band. Generally, due to the lack of sophistication in consumer-grade Wi-Fi equipment, there is not a complicated hierarchy of priority within radio bands available to the public. However, on radio bands where, for example, the U.S. Navy and satellite communication companies share licenses, a hierarchy can be enforced, such that the Navy will not be crowded out of the band by the satellite communication company, in the event of full bandwidth utilization.

However, beginning in 2017, a hybrid bandwidth licensing system was brought into use, known as Citizens Broadband Radio Service, or CBRS. CBRS, which exists in and controls the 3.5 GHz band, attempts to meet the needs of several groups. First, CBRS continues to provide an incumbent license to the U.S. Navy and their radar systems. This is because the 3.5 GHz band was initially assigned to this group, and the FCC has no interest in displacing them. Second, CBRS has priority access licenses for 10 MHz channels within the band, limited to ten years temporally, and a single county geographically. Licensees in this range, expected generally to be telecommunication companies, will have priority access to their portion of the band, for the life of their license, in their county. This priority is over the general population, but under the incumbent licensees. Finally, there are general access channels, which are 53% of the band and not available for priority access licenses. The general population, priority access licensees, and incumbent licensees can operate on this range, without a license, so long as they do not interfere with incumbent licensees. The general population can also operate on the priority access portions of the band, so long as they do not interfere with the incumbent or priority access licensees.

This multi-tiered radio band allows for higher utilization of valuable radio bandwidth that otherwise may have gone unused. However, due to the complicated hierarchical nature of the band licenses, an access system management framework was needed to enforce access restrictions.

In parallel with the CBRS initiative, other changes have been taking place within the wireless industry, including a move away from centralized processing of all wireless access activity and the introduction of Internet Protocol (IP)-based connectivity between wireless access components when possible.

Designing a wireless access node that can fully utilize the potential of the CBRS band is full of unexpected difficulties. Such a node needs to interface with the spectrum access system, in order to remain compliant with any licenses the spectrum access system has issued or revoked. The node may also be placed at the end of a broadband access network with only IP connectivity to the larger wireless access network. A remote CBRS node would potentially be constrained by the capabilities of the broadband access network that provided traffic backhaul capabilities. Such a node would need to coordinate its backhaul capabilities which may also be constrained to match the forward capabilities of the CBRS interface which at the same time may also be constrained.

SUMMARY

In an example, a wireless access node comprises a radio frequency (RF) communication band interface configured to establish and maintain computing device connections and communications by utilizing a first spectrum channel. The wireless access node additionally includes a non-wireless data transmission interface configured to transport signals and traffic to and from a broadband access network. The wireless access node further includes a processor coupled to the RF communication band interface and the non-wireless data transmission interface. The wireless access node still further includes a memory accessible to the processor. The memory includes programming, wherein execution of the programming by the processor configures the wireless access node to perform functions to request a first spectrum channel authorization to utilize the first spectrum channel from a spectrum access system. Execution of the programming by the processor additionally configures the wireless access node to accept a first spectrum channel authorization response to utilize the first spectrum channel from the spectrum access system. Execution of the programming by the processor further configures the wireless access node to receive a first service request from a first computing device over the first spectrum channel. Execution of the programming by the processor further configures the wireless access node to send a first heartbeat message to the spectrum access system. Execution of the programming by the processor furthermore configures the wireless access node to receive a first heartbeat response message from the spectrum access system. Execution of the programming by the processor yet further configures the wireless access node to send a first service flow request from the broadband access network to accommodate the first service request.

In another example, a method comprises requesting a first spectrum channel authorization to utilize a first spectrum channel from a spectrum access system. The method additionally includes accepting a first spectrum channel authorization response to utilize the first spectrum channel from the spectrum access system. The method further includes receiving a first service request from a first computing device over the first spectrum channel. The method still further includes sending a first heartbeat message to the spectrum access system. The method furthermore includes receiving a first heartbeat response message from the spectrum access system. The method yet further includes sending a first service flow request from the broadband access network to accommodate the first service request.

In yet another example, a non-transitory machine-readable medium contains machine-readable programming instructions. The instructions cause a wireless access node to request a first spectrum channel authorization to utilize a first spectrum channel from a spectrum access system. The instructions additionally cause the wireless access node to accept a first spectrum channel authorization response to utilize the first spectrum channel from the spectrum access system. The instructions further cause the wireless access node to receive a first service request from a first computing device over the first spectrum channel. The instructions still further cause the wireless access node to send a first heartbeat message to the spectrum access system. The instructions furthermore cause the wireless access node to receive a first heartbeat response message from the spectrum access system. The instructions yet further cause the wireless access node to send a first service flow request from the broadband access network to accommodate the first service request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one or more implementations in accordance with the present teachings by way of example only, not by way of limitation. In the figures, like reference numbers refer to the same or similar elements.

FIG. 3 is a diagram of the CBRS radio band, specifically the 3.5 GHz band.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

Figure 1:
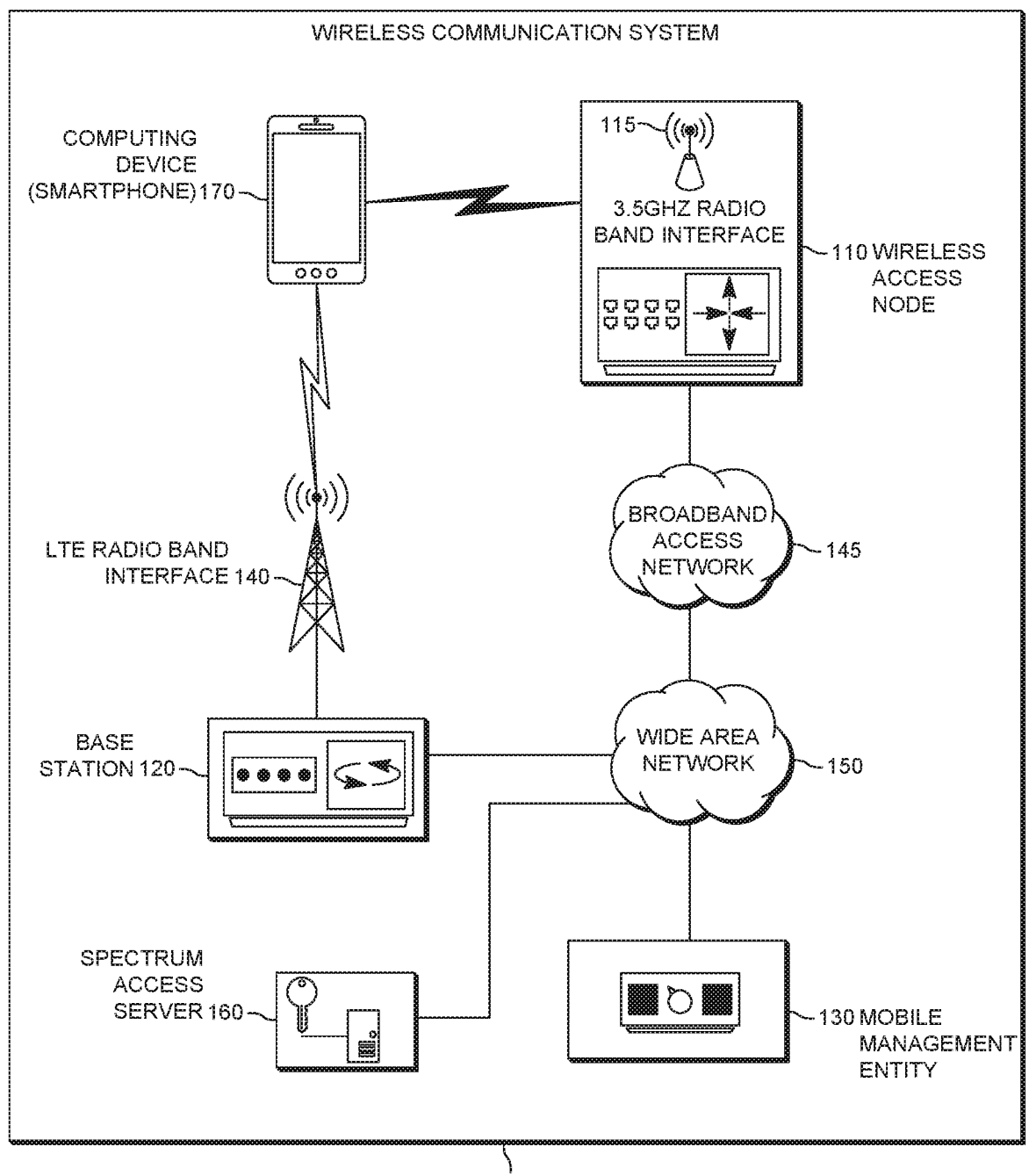
FIG. 1 is a network diagram showing a wireless access node, two base stations, a mobile switching controller, an LTE radio band interface, a wide area network (WAN), and the CBRS spectrum access system, all working together to provide efficient and reliable service to a computing device.

FIG. 1 is a network diagram of a distributed wireless communication system 100, with a wireless access node 110, one base station 120, a mobile management entity 130, a cellular Long Term Evolution (LTE®) radio band interface 140, a broadband access network 145, a wide area network 150, a spectrum access system server 160, and a computing device 170. The wireless access node 110 has a 3.5 GHz radio band interface 115 integrated into itself.

A wireless access node 110 is a network node configured to provide wireless connections to computing devices 170. Node 110 includes an LTE evolved Node B unit, commonly called an eNodeB. It provides a radio interface for computing devices 170 to access the wired network. It usually has the hardware to provide for a non-wireless connection to a broadband access network 145 that connects directly or indirectly to a wide area network 150, in order to facilitate communications outside of the local wireless network created by the wireless access node 110.

A 3.5 GHz radio band interface 115 is a radio interface specifically designed to operate within the CBRS 3.5 GHz radio band range 300. The interface 115 connects to computing devices 170 and, in conjunction with the rest of the wireless access node 110, allows the computing devices 170 to communicate with each other, or with a larger wide area network 150.

A broadband access network 145 connects the access node 110 to the wide area network 150. The network 145, in some implementations, may be wired, such as a CableLabs Data Over Cable Service Interface Specification enabled (DOCSIS®) HFC network or a Passive Optical Network (PON), or it may be wireless, such as a 60 GHz mesh network connection. Bandwidth within network 145 may be allocated and policed on a service flow basis. A service flow is defined within the network to support certain parameters, such as a maximum instantaneous bandwidth. A service flow may also have a certain priority within the network so that its traffic can displace other traffic in different service flows if that other traffic is of a lesser priority.

A base station 120 is a network device capable of taking a variety of types of network access nodes' traffic and standardizing it before passing it on to a larger wide area network 150. It may perform phone switching tasks, or boost or smooth signals, or convert to and from analog and digital signals.

A Mobility Management Entity (MME) 130 is a network device capable of communicating with multiple base stations 120 and nodes 110, and efficiently routing traffic based on properties of the base station 120 and node 110, current network usage, and data needs of a computing device 170. For example, a mobile switching controller may decide to send to a single computing device 170 requesting 12 Mb/s of streaming data: 4 Mb/s over an LTE-connected base station 120B, and the remaining 8 Mb/s over a Wi-Fi-connected base station 120, ultimately providing the full 12 Mb/s stream requested. An MME 130 might also see that a first base station 120 is reaching capacity, and direct traffic that is ambivalent to using either the first base station 120 or a second, underutilized node 110, in order to prevent the first base station 120 from being overwhelmed. A base station 120 or node 110 may be connected to an MME 130 by direct connections, which are efficient but costly, or a base station 120 or node 110 may be connected to an MME 130 by a WAN 150.

An LTE radio band interface 140 is specifically configured to operate on LTE radio bands. These interfaces are commonly large towers, providing wireless coverage over multiple-mile radii. However, they can also be of a smaller size, comparable to other wireless access nodes 110.

A wide area network 150 is a general IP network, such as the Internet. It also might be an interconnected array of computing devices 170 on a private IP network, such as a telecommunications network. It could also be a smaller computing network than the Internet, such as a campus network.

A spectrum access system server (SAS) 160 is a database server, certified by the FCC and operated and administered by one of various private enterprises, which maintains records of who is licensed to use what sections of the 3.5 GHz CBRS radio band 300, at what time, and in what geographic area. It is able to take requests for bandwidth from devices configured to communicate with it, it can check its records for licenses, check its records for current utilization, and it can grant and revoke bandwidth rights based on its internal rule structure. The SAS 160 can be reached by node 110 or interface 140 over the WAN 150.

A computing device 170 is any computer capable of connecting to a wireless network, and in this example specifically a wireless network created by a 3.5 GHz radio band interface 115. Commonly, the computing device 170 would be a cellular telephone, though any device with a radio interface that can communicate over the 3.5 GHz range could be a computing device 170 for the purposes of this invention.

In this example, a computing device 170, a smartphone, is connected to an LTE radio band interface 140, a cell tower. The computing device 170 seeks to perform a large download of data. In a conventional wireless communication system, without a wireless access node 110, the entire download would need to occur using the cell tower 140 which would require a lengthy amount of time or potentially cause congestion if the air interface of tower 140 was entirely allocated to that download to the exclusion of other devices' communications. However, this wireless communication system 100 has access to a 3.5 GHz-enabled wireless access node 110, capable of communicating with the SAS 160.

A 3.5 GHz wireless connection, when available, is usually desirable over an LTE cell tower, due to the fact that it may provide a higher bandwidth connection, and a wireless access node 110 creating a wireless network from its radio band interface 115 generally has a smaller radio radius, allowing multiple non-overlapping wireless access nodes 110 to operate on the same frequency within the radius of a single LTE cell tower 140. As an illustration, an LTE tower 140 might use a 1 MHz-wide channel in a 10 MHz licensed band for a single connection: therefore, the tower 140 can only have 10 connections at a time, in this illustration in a 50 mile radius. Contrast that with a field of non-overlapping 3.5 GHz wireless access nodes 110, which in this illustration have a radio radius of 50 feet, and within an equivalent ten 1 MHz channels such a network could carry several million more connections than the LTE tower 140.

Therefore, the wireless communication system 100 is incentivized to transfer the computing device 170 to a 3.5 GHz wireless access node 110. MME 130 is aware that the computing device 170 is within range of the wireless access node 110, for example by having the computing device 170 notify MME 130 that it is within range of the wireless access node 110, or by having an internal map of the relationship between the cell tower 140 and wireless access node 110, or by having the computing device's 170 GPS position, as well as the GPS position of the wireless access node 110. MME 130, knowing the computing device 170 is within range of the wireless access node 110, requests the wireless access node 110 secure bandwidth for the computing device 170. The wireless access node 110 then passes a message over WAN 150, requesting authorization from the SAS 160 to utilize a channel in the CBRS radio band 300 licensed to the wireless communication system 100 in order to connect and stream data to the computing device 170. The SAS 160 checks the current usage, and sends authorization to the wireless access node 110 to use a channel in band 300 for the computing device 170, for a period of time. In this example, the channel is 3550 MHz 355, and the period of time is ten minutes. The wireless access node 110 notes this authorization, and sends a service request to network 145 to request a similar bandwidth service flow. Once node 110 has received authorization of the requested broadband access network service flow, it notifies the SAS that it will begin using the assigned CBRS flow with a heartbeat message. Upon receiving a final approval from the SAS through a heartbeat response message, node 110 connects with computing device 170 and begins communications.

Once the wireless access node 110 has connected to the computing device 170, MME 130 begins sending the majority of the network traffic for the computing device 170 through the wireless access node 110, potentially only preserving a heartbeat connection between the cell tower 140 and the computing device 170 to monitor the connection quality between the computing device 170 and the wireless access node 110.

This same result can be achieved by the wireless access node 110 performing routing decisions as well. The wireless access node 110 can receive a request for a service flow from a computing device 170. It can then request a spectrum authorization from the SAS 160. Next, it can accept the authorization response from the SAS 160. With a positive response, the wireless access node 110 can request a new service flow from broadband area network 145. Upon receiving a service flow from broadband access network 145, the wireless access node 110 connects the computing device 170 to the wide area network 150 and allows data service to flow from the computing device 170 to and from the wide area network 150.

Figure 2:
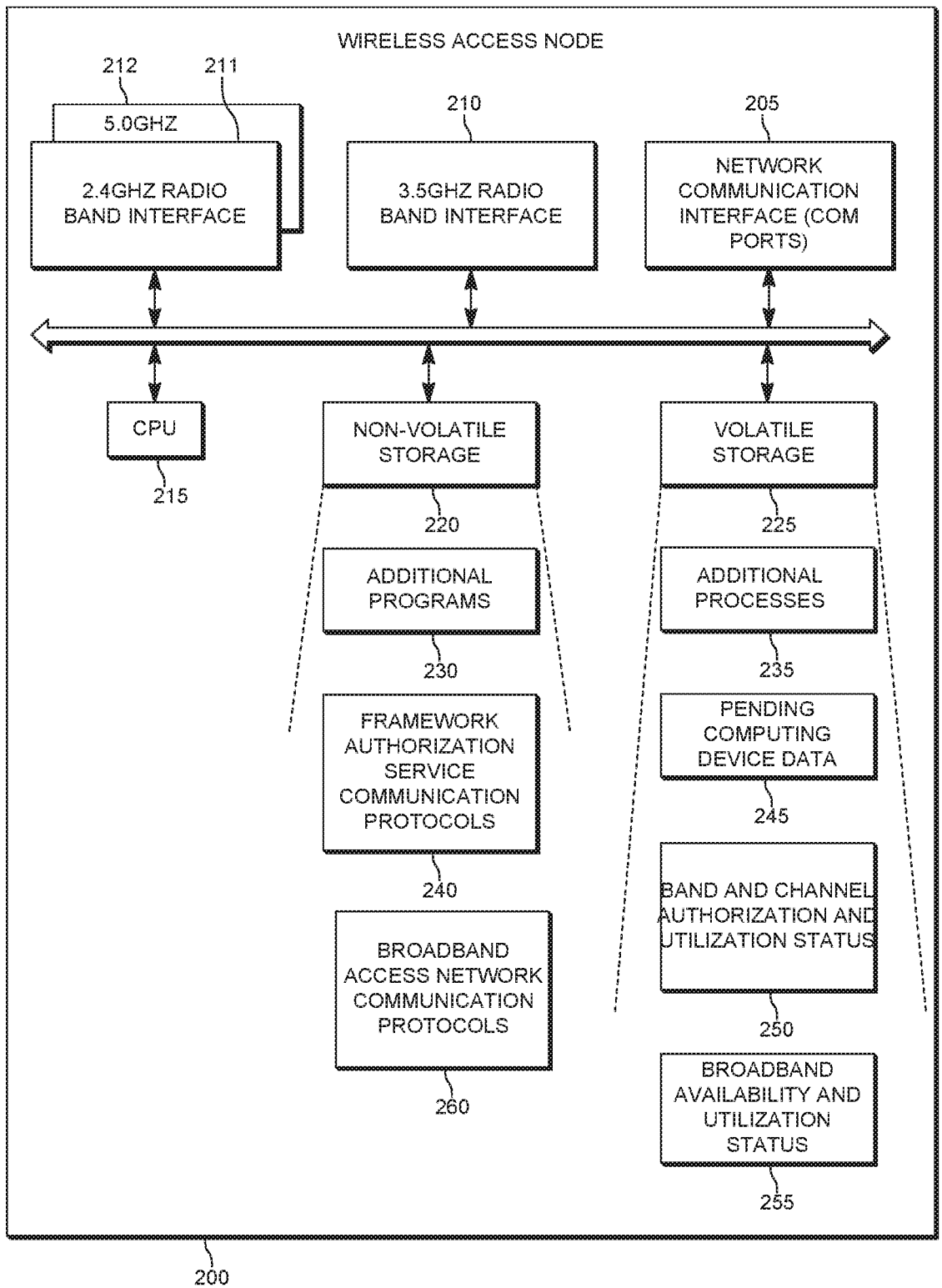
FIG. 2 shows an example of a hardware configuration for a wireless access node, specifically one with embedded Wi-Fi radio band interfaces in addition to a CBRS radio band interface.

FIG. 2 shows an example of a hardware configuration for a wireless access node 200 in simplified block diagram form. In this example the wireless access node 200 includes a network communication interface 205, for making connections to a broadband access network 145 that allows communication with a wide area network 150, and transferring communications to any entity connected to the wide area network 150, such as the spectrum access system server 160 or MME 130. In instantiations, interface 205 may be a cable modem capable of supporting multiple service flows with a variety of quality of service parameters such as bandwidth, jitter, latency, among others.

The node 200 additionally includes a radio interface. A 3.5 GHz radio band interface 210 allows connecting the wireless access node 200 to wireless computing devices 170 over the CBRS radio band 300. The node 200 also includes radio interfaces 211, 212 allowing communications over 2.4 and 5 GHz unlicensed radio bands. Interfaces 211, 212 allow the node 200 additional communication opportunities with wireless computing devices 170 if those devices support 2.4 or 5 GHz communications.

The node 200 further includes circuits forming one or more processors to implement a central processing unit (CPU) 215 that controls operations of the wireless access node, including operations to communicate with the spectrum access system 160 and control usage of the CBRS radio band 300 by the 3.5 GHz radio band interface 115. CPU 215 further controls operations to communicate with the broadband access network 145 to request and release bandwidth access, typically though the mechanism of service flow management. Other operations controlled by the processors include communication with the MME 130 and other elements of the LTE network.

As shown, the wireless access node 200 includes persistent non-volatile storage 220, such as ROM or flash memory for permanently storing the wireless access node's 200 functions related to communicating with and following the spectrum access system 160 protocols 240, as well as additional programming 230 required for MME 130 protocols and the general functionality of the wireless access node 200. Additionally, storage 220 permanently stores node 200's functions relating to communicating with broadband access network 145 through interface 205.

The wireless access node 200 also includes volatile storage 225, utilized for execution by the CPU 215. This volatile storage may contain any information about pending and connected computing device 170 data 245, cached information about bands and channels the wireless access node 200 is authorized to use 250, or the availability and current utilization of the broadband connections facilitated by the network communication interface 255. Storage 225 may also contain additional processes 235 required for the general functionality of the wireless access node 200.

FIG. 3 is a chart of the CBRS 3.5 GHz radio band 300, and the constraints that define the CBRS system for the spectrum access system 160. From left to right is a list of counties. In this example, we are concerned with a single county 315. So, in this example county N+1 314 may be the neighborhood just west of county N 315, and county N−1 316 may be the neighborhood just East of county N 315. The spectrum access system 160 tracks channel licenses and permissions at the county level, therefore this is currently the highest level of geographic granularity that a wireless communication system 100 would need to concern itself with when deciding where to place wireless access nodes 110 and identifying which licenses the wireless access nodes 110 need to be associated with.

The chart from bottom to top is the electromagnetic spectrum. The CBRS 3.5 GHz band exists between 3500 MHz and 3700 MHz, therefore, the current CBRS implementation is not concerned with frequencies at or below 3499 MHz, or at or above 3700 MHz. Thusly, when combining the geographic limitation of county N 315 with the electromagnetic spectrum range of 3500 MHz to 3700 MHz, we have the CBRS 3.5G band 300 in a given licensing area.

Within the CBRS 3.5 GHz band 300, there are several divisions. Namely, there are fifteen priority access channels 350-364, each 10 MHz wide, from 3500 MHz through 3650 MHz. Each of these priority access channels 350-364 can have a priority access license issued to a licensee, granting them exclusive usage rights over all groups except incumbent licensees, such as the U.S. Navy. The general public can also opportunistically use these priority access channels, so long as they do not interfere with either incumbent licensees, or priority access license holders for a given channel.

Second, in addition to these priority access channels 350-364, there are also general access channels 365, between 3650 MHz and 3700 MHz. These channels are not licensed in the same way that the priority access channels 350-364 are, insofar as they are open like Wi-Fi channels, but still must cede bandwidth to any incumbent licensees. Priority access licensees may also use these channels, but without the same priority they enjoy in their licensed priority access channels 350-364.

The spectrum access system 160 manages all of this—it tracks the licensees in a county 315 for a given priority access channel 350, and tracks who is using the channel so that incumbent licensees, priority access licensees, and general access users do not interfere with others' rightful usage of the spectrum.

Figure 4:
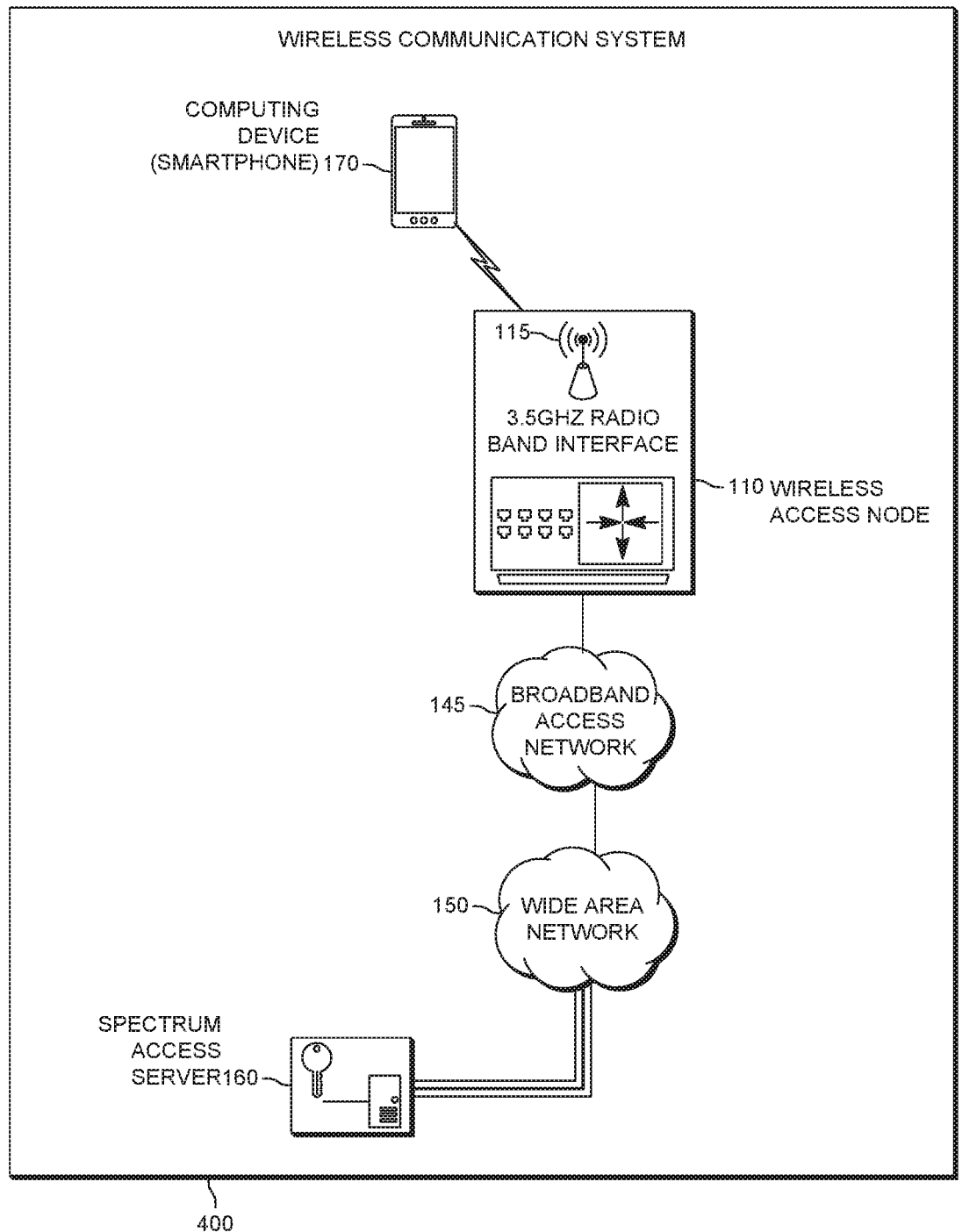
FIG. 4 is a network diagram showing a wireless access node, a wide area network, and the CBRS spectrum access system, all working together to provide efficient and reliable service to a computing device.

FIG. 4 is a network diagram of a wireless communication system 400, with several elements in common with the wireless communication system 100 example in FIG. 1. This wireless communication system 400 has a wireless access node 110, a broadband access network 145, a wide area network 150, a spectrum access system 160, and a computing device 170. The wireless access node 110 has a 3.5 GHz radio band interface 115 integrated into itself.

In this example, a computing device 170, a smartphone, is attempting to connect to the wide area network 150 via the wireless access node 110. The computing device 170 requests that the wireless access node 110 secure bandwidth for the computing device 170. It may communicate this information over a smaller section of channel in the 3.5 GHz range known to be available for initiating calls, possibly in the general access channel 365. Or, perhaps the CBRS connection is negotiated over a Wi-Fi or LTE connection not shown. All of these options are possible implementations, and all of the devices may be capable of performing any one or all of these methods.

The wireless access node 110 then passes a message over the system 400, requesting authorization from the spectrum access system 160 to utilize a channel in the CBRS radio band 300 licensed to the wireless communication system 100 in order to connect and stream data to the computing device 170. The spectrum access system 160 checks the current usage, and sends authorization to the wireless access node 110 to use a channel in the band 300 for the computing device 170, for a period of time. In this example, the channel is 3560 MHz 356, and the period of time is one hour. The wireless access node 110 then requests a suitable amount of traffic capacity from the broadband access network at an appropriate priority. If the computing device 170 has requested a voice call connection, for example, the priority of the channel requested from the network 145 would be higher than if device 170 has requested a best effort data connection. Node 110 may request an increase to an existing service flow to accommodate the request from device 170, or node 110 may request a separate service flow whose parameters align with that of the request from device 170. If network 145 also accepts the request from node 100, then node 110 accepts the CBRS authorization and the access network authorization. Node 110 initiates the new service flow, if needed and increases the amount of the 3560 MHz channel 356 used in order to connect to the computing device 170. After connecting, traffic from the wide area network 150 is passed to the computing device 170 via the wireless access node 110 via the service flow in network 145 negotiated in the service request.

In embodiments, node 110 may decide that the service request will require a virtual private network (VPN) connection. In this scenario, the wireless access node 110 instantiates a virtual private network connection over the first service flow, in order to protect the contents and stability of the requested flow.

It is also possible that the broadband access network 145 can refuse a service flow request by the wireless access node 110. In that scenario, the wireless access node 110, upon receiving the refusal message, will return a failure response to the computing device 170. The computing device 170 will need to seek a data connection elsewhere, perhaps from a different wireless access node 110.

It is further possible that the service request may be initialized from within the wide area network 150. Perhaps a server connected to the wide area network 150 requests to send a flow of data to the computing device 170, for example a software update, or a batch of incoming emails for an email account associated with the computing device 170. In this scenario, the service request would originate from within the wide area network 150, and ultimately be passed to a base station 120 connected to the broadband network 145. This station 120 will then send a service request to the wireless access node 110. The wireless access node 110 will determine efficient routing, in a similar manner to the scenario where the service request originates from the computing device 170. The wireless access node 110 will then request an increase in bandwidth on an existing service flow between the computing device 170 and the wide area network 150, or it will request a second service flow to be created between the computing device 170 and the wide area network 150. After connecting, traffic from the wide area network 150 is passed to the computing device 170 via the wireless access node 110 via either the new or the existing service flow in the broadband network 145 negotiated in the service request.

Figure 5:
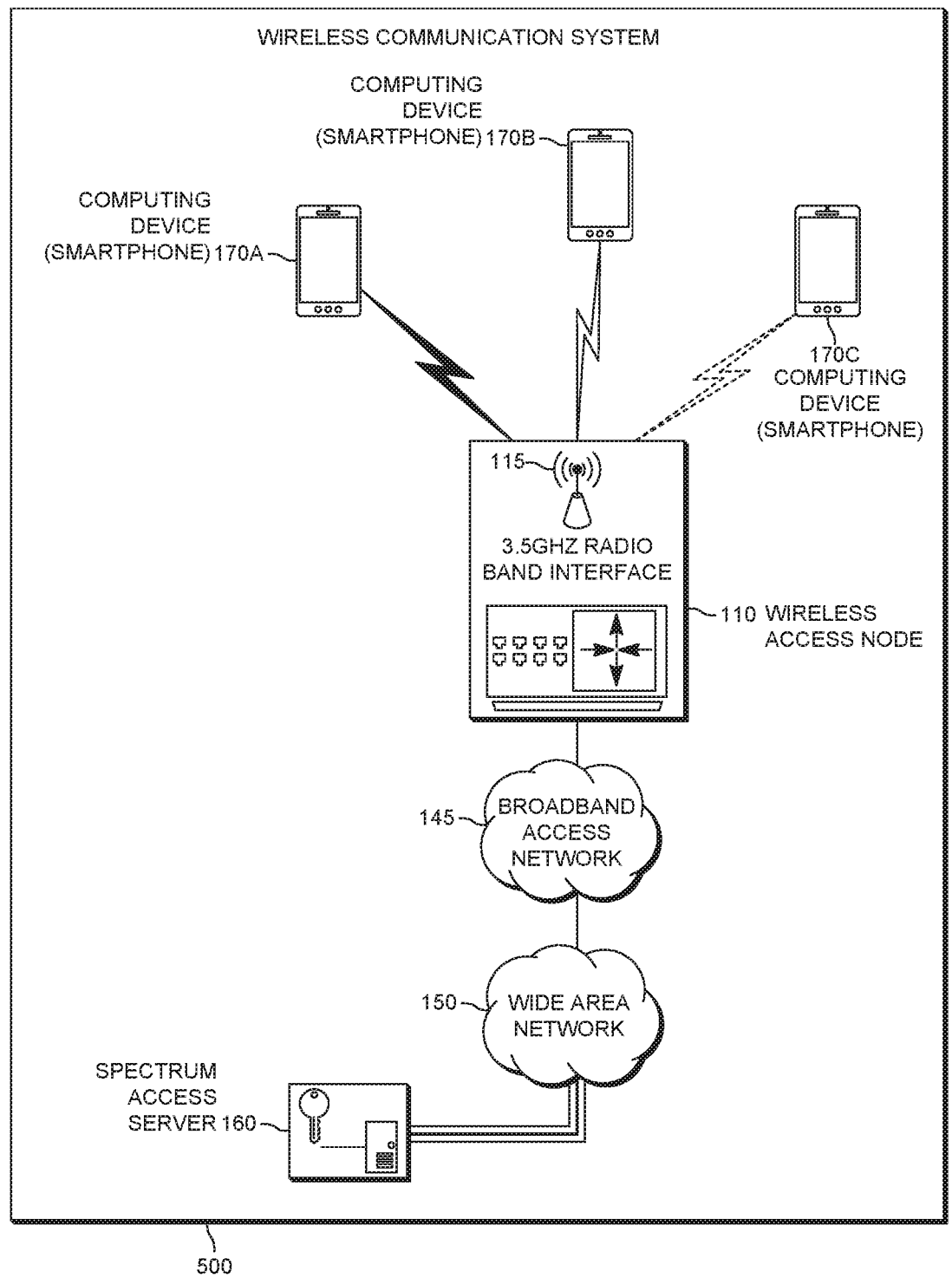
FIG. 5 is a network diagram showing a wireless access node, a wide area network, and the CBRS spectrum access system, all working together attempting to provide efficient and reliable service to three computing devices.

FIG. 5 is a network diagram of a wireless communication system 500, with several elements in common with the wireless communication system 400 example in FIG. 4. This wireless communication system 500 has a wireless access node 110, a broadband access network 145, a wide area network 150, a spectrum access system 160, and three computing devices 170A-C. The wireless access node 110 has an integrated 3.5 GHz radio band interface 115.

In this example, a first computing device 170A, a smartphone, is already connected and using the 3560 MHz channel 356 in order to stream data from the wide area network 150 via the wireless access node 110 through a service flow over broadband access network 145. A second and third computing device 170B, 170C, both of which are also smartphones, are attempting to connect to the wide area network 150 via the wireless access node 110. The second computing device 170B requests that the wireless access node 110 secure bandwidth for the second computing device 170B.

The wireless access node 110, which in this example only has access to a single license in its county for the 3560 MHz channel 356, knows it only has this single license, and also knows it is fully utilizing this channel, by checking its internal band and channel authorization and utilization statuses 250. The wireless access node 110 also has a single broadband access network service flow of a certain rate, in this example 10 Mb/sec. Therefore, the wireless access node 110 passes a message over the system 500, requesting authorization from the spectrum access system 160 to utilize a channel in the CBRS radio band 300 either in another priority access channel that is not being utilized, or in the general access channels 365, in order to connect and stream data to the second computing device 170B.

The spectrum access system 160 checks the current usage, and sends authorization to the wireless access node 110 to use a channel in the band 300 for the second computing device 170B, for a period of time. In this example, the channel is 3640 MHz 364, and the period of time is one hour, or until revoked. The wireless access node 110 accepts this authorization, and increases the amount of the 3640 MHz channel 364 used in order to connect to the second computing device 170B.

After connecting, the wireless access node analyzes the data usage needs of the second computing device 170B, as well as the current service flow usage of the first computing device 170A. If the service allocation from MME 150 to both the first computing device 170A and second computing device 170B are less than 10 Mb/sec (the service flow upper limit), then the wireless access node 110 determines efficient routing for the service requests and increases the usage of the service flow within the limit (in this example 10 Mb/sec) to accommodate both computing devices 170A-B and their service requests. In embodiments, if the second computing device 170B is connecting to make an LTE call or its traffic otherwise requires special handling, then the wireless access node 110 sets up a virtual private network (VPN) connection for the second computing device 170B's service request.

If, after the wireless access node 110 analyzes the service requests, the service allocations from MME 150 to both the first computing device 170A and second computing device 170B exceeds the service flow limit (in this example 10 Mb/sec), then the wireless access node determines efficient routing for the service requests, and requests a second service flow to accommodate the second computing device's 170B service request. In this scenario, the first computing device 170A continues using the first service flow, while the second computing device 170B uses the second service flow.

The third computing device 170C also requests in turn that the wireless access node 110 secure bandwidth for the third computing device 170C. The wireless access node 110 is aware that it has not used all of channel 364, and so node 110 can direct device 170C to utilize a timeslot within channel 364. If node 110 determines further that the bandwidth requirements of device 170C fit within one of the existing service flows, node 100 may direct the traffic from device 170C into that service flow.

Figure 6:
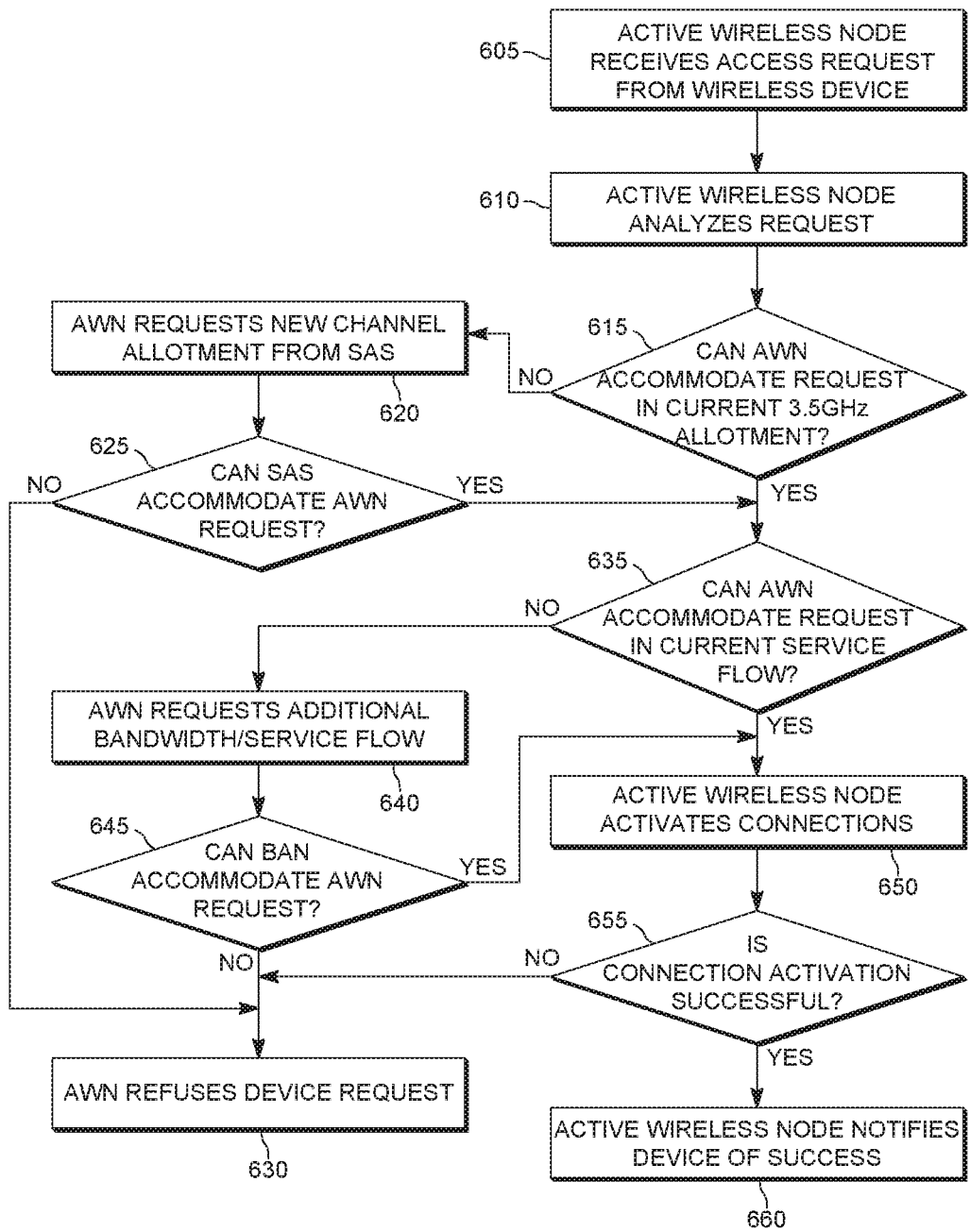
FIG. 6 is a flowchart showing the operation of connecting a computing device to a CBRS wireless access node via the CBRS 3.5 GHz radio band, based on a request from the computing device and activating service for the computing device back into the wide area network.

FIG. 6 is an example flowchart of how an active wireless access node 110 could process a request from a computing device 170 for service. In operation 605, the wireless access node 110 receives an access request from a computing device 170. They may communicate this information over a smaller section of channel in the 3.5 GHz range known to be available for initiating connections, possibly in the general access channel 365. Or, perhaps the CBRS connection is negotiated over a Wi-Fi or LTE connection not shown. All of these options are possible implementations, and both of the devices may be capable of performing any one or all of these methods.

In operation 610, node 110 analyses the request from device 170. The service request may include information about the service required, such as the bandwidth required or the service priority required. For instance within LTE, the Establishment Cause information element of a Connection Request message indicates the type of connection sought by the device. Node 110 may alternatively or in addition make assumptions about the operational parameters required by the device from the type of request. Node 110 may also have additional information from the prior behavior of device 170, prior behavior of devices similar to device 170 as well as other characteristics of device 170.

Operation 615 is a question: can node 110 accommodate the request from device 170 in the current 3.5 GHz channel allotment of node 110? Perhaps the wireless access node 110 has not yet activated a CBRS channel with the SAS or its current allotment is insufficient for the required traffic. If the answer is no, then operation 620 occurs, and the wireless access node 110 requests a new channel allotment from SAS 160. This request leads to another question 625: Can SAS 160 accommodate node 100's request? If the answer is no, indicated for example by a response to node 110 from SAS 160 that does not provide a new allocation of spectrum, then operation 630 occurs in which node 110 refuses the device request. If the answer is yes, indicated for example by a response from SAS 160 to Node 110 with a new allocation of spectrum, then the flow returns to question 635.

If the answer to operation 615 or the answer to operation 625 is yes, then in operation 635 the wireless access node 110 determines whether can accommodate device 170's request in its current service flow allotment. Note that service flows may be unidirectional, in which case node 100 checks an upstream service flow as well as a downstream service flow to determine if both can accommodate the additional load. To simplify the discussions, a pair of unidirectional upstream and downstream flows will be called a bidirectional service flow. If node 110 is configured to allocate each device's traffic to a separate bidirectional service flow, then node 110 proceeds to operation 640. If node 110 is configured to allocate multiple devices' traffic to a single bidirectional service flow, then node 110 must make a further determination of whether the current bidirectional service flow has sufficient bandwidth to accommodate the additional traffic from device 170. It can determine this by checking internal memory regarding the characteristics of the current flows as well as checking recent activity on the downstream flows and the state of any queues or buffers that contain traffic awaiting transmission on applicable upstream flows. If the answer to this question is no, then the node 110 proceeds to operation 640 to request additional flows or to request an additional bandwidth allocation to certain existing flows from the broadband access network 145. In operation 645 the broadband access network 145 determines whether or not it can accommodate node 110's request. If network 145 cannot accommodate node 110's request, i.e. the answer to the query is no, then node 110 continues to operation 630 and refuses device 170's request. If network 145 can accommodate node 110's request, then node 110 continues to operation 650. Returning to operation 635, if node 110 determines that device's 170's request can be accommodated in the current service flows, the node 110 also continues to operation 650. In operation 650, node 100 activates the connections needed to accommodate device 170. For the wireless connection, if SAS 160 gave node 110 a new channel allocation in operation 625, node 110 sends a heartbeat request to SAS 160 to activate the new channel allocation. Operation 655 questions whether the connection activations were successful. There is still a chance that SAS 160 might rescind the earlier allocation in a heartbeat response. If the connection activation is unsuccessful, then node 110 continues to operation 630 to notify device 170 that service is refused. Node 110 may also set up a Virtual Private network (VPN) connection in upstream and downstream directions if it is configured to do so for certain devices or types of traffic or for all devices. If the connection activation succeeds, then node 100 continues to operation 660 and notifies device 170 of the channel allocation and any other information it needs to begin normal operation, such as an IP address.

Figure 7:
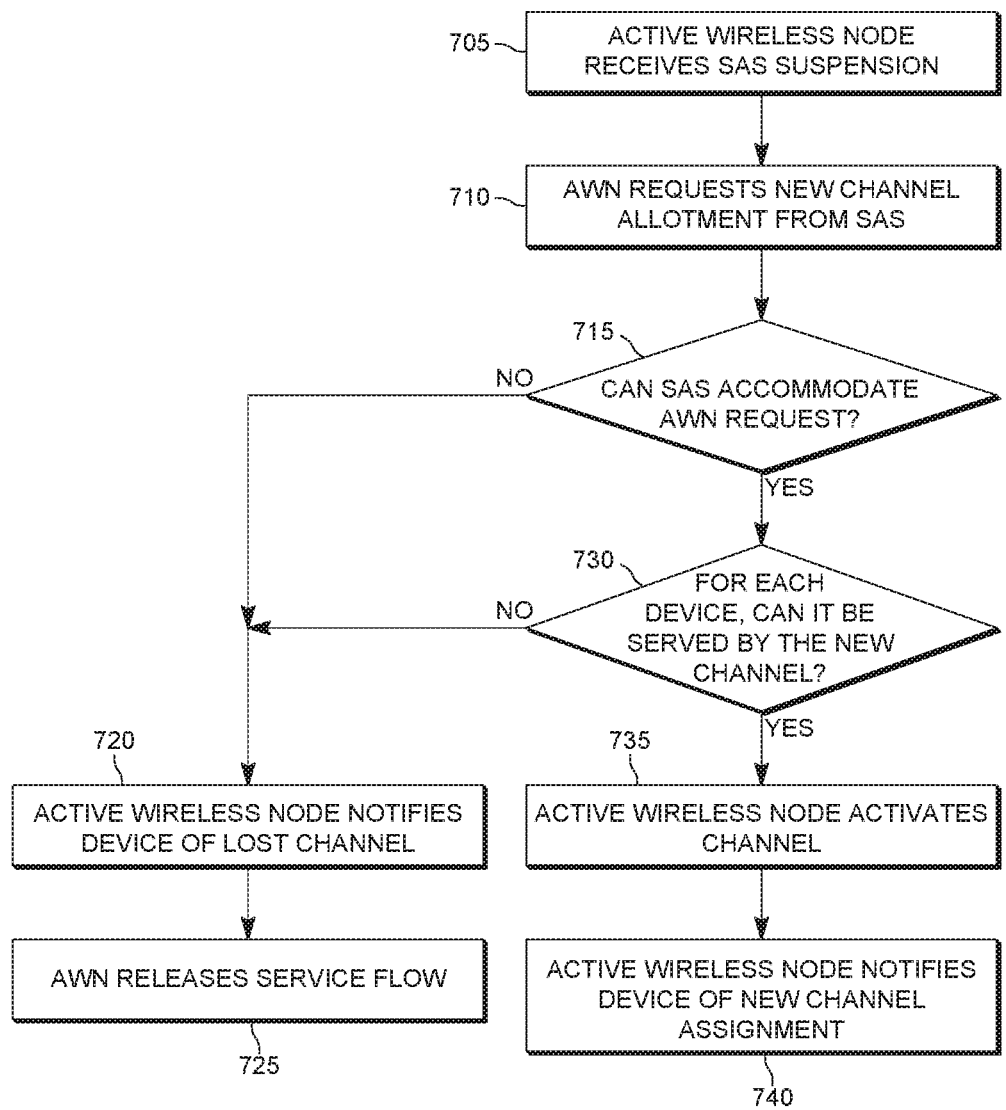
FIG. 7 is a flowchart showing the operation of connecting a computing device to a CBRS wireless access node via the CBRS 3.5 GHz radio band, based on a request from a mobile switching controller on behalf of the computing device.

FIG. 7 is an example flowchart of how a wireless access node 110 responds to an access revocation made by the spectrum access system. In operation 705, the wireless access node 110 receives a revocation from the spectrum access system 160. A license revocation may proceed from several different sources. A government incumbent use may have been detected which revokes even priority access licensed users' rights to spectrum. Another source of a spectrum revocation is if a general authorized access user had begun using a priority access licensed user's spectrum and then the Priority Access License (PAL) user wants to return to its spectrum. Under the current rules, node 110 has one minute to vacate the channel(s) after a notification, but it can use that time to attempt to remain in operation.

In operation 710 node 110 requests a new channel allotment from SAS 160. Question 715 illustrates SAS 160 determining if there is another channel allotment available for node 110. For example, even if node 110 must vacate a PAL channel when the licensed user begins operation, node 110 may still be able to use a General Authorized Access (GAA) channel or even another PAL channel that is currently unused. If SAS 160 cannot find another channel for node 110, answering no to question 715, then node 110 continues to operation 720 when it notifies any devices currently using the revoked channel allotment that their service has been cancelled. Node 110 continues to operation 725 and releases any related service flows on broadband access network 145.

If SAS 160 returns a new channel allotment to node 110, yes in question 715, then node 100 continues to question 730, can the new channel allotment accommodate the same devices currently using the revoked channel. For devices that can be accommodated on the new channel allotment, node 110 continues to operation 735 to activate the new channel. For devices that cannot be accommodated on the new channel allotment, node 110 continues to operation 720 to notify the affected devices that their service has been revoked. Node 110 may continue to operation 725 if the affected devices had any dedicated service flows that need to be released.

After operation 735, activating the channel allotment with SAS 160, node 110 continues to operation 740 to notify the devices of the new channel assignment.

In general, the term "functions," as used herein, refers to logic embodied in hardware software instructions, which can be written in a programming language, such as Java™, C, C++, C#, for example. A software function can be compiled into executable programs or written in interpreted programming languages, such as Perl, Visual Basic script, HTML, or JavaScript. Software functions may be callable from other functions. Generally, functions described herein refer to logical modules that may be merged with other modules or divided into sub-module despite their physical organization. The functions can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine readable medium. For example, programming code could include code for the server or the sending device for generating meta-data files and programming for the receiving device for reproducing content based on the meta-data files. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the wireless access point and computing devices. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the computing device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device, comprising:
    an interface circuit configured to communicate with a second electronic device using a wireless communication protocol in a channel in a band of frequencies;
    a second interface circuit configured to communicate via a network using a wired communication protocol;
    a processor coupled to the interface circuit and the second interface circuit;
    memory, coupled to the processor, configured to store program instructions, wherein, when executed by the processor, the program instructions cause the electronic device to perform operations comprising:
providing, from the second interface circuit, an allocation request addressed to a server for the channel in the band of frequencies;
receiving, at the second interface circuit, an allocation response associated with the server, wherein the allocation response authorizes use of the channel;
attempting to establish, via the second interface circuit, a service flow with the network, wherein the service flow has a capacity corresponding the channel;
selectively providing, from the second interface circuit and based at least in part on successfully establishing the service flow, a heartbeat message addressed to the server, wherein the heartbeat message indicates that the channel will be used; and
receiving, at the second interface circuit, a heartbeat response associated with the server, wherein the heartbeat response approves use of the channel.

2. The electronic device of claim 1, wherein the electronic device comprises an evolved Node B (eNodeB) or an access point.

3. The electronic device of claim 1, wherein the server is associated with a spectrum access system.

4. The electronic device of claim 1, wherein the band of frequencies comprises at least a portion of a Citizens Broadband Radio Service or a 3.5 GHz band.

5. The electronic device of claim 1, wherein, prior to providing the allocation request, the operations comprise receiving, at the second interface circuit, an instruction associated with a computer in a cellular-telephone network to secure the channel for use in communication with the second electronic device.

6. The electronic device of claim 5, wherein, after the heartbeat response, the operations comprise establishing, via the interface circuit, a connection with the second electronic device; and
wherein the connection uses the channel.

7. The electronic device of claim 1, wherein, prior to providing the allocation request, the operations comprise receiving, at the interface circuit, a request associated with the second electronic device to secure bandwidth for the second electronic device.

8. The electronic device of claim 1, wherein attempting to establish the service flow comprises attempting to increase an existing service flow.

9. The electronic device of claim 1, wherein, when the electronic device is unable to establish the service flow, the operations comprises providing, via the interface circuit, a failure message addressed to the second electronic device.

10. The electronic device of claim 1, wherein the operations comprise selectively setting up a virtual private network (VPN) connection for the second electronic device based at least in part on a type of traffic associated with the second electronic device or a type of the second electronic device.

11. The electronic device of claim 1, wherein the capacity corresponds to a service level of the allocation request.

12. The electronic device of claim 1, wherein the operations comprise, based on usage of the capacity, establishing, via the second interface circuit, a second service flow or modifying, via the second interface circuit, the service flow.

13. The electronic device of claim 1, wherein the allocation request is based at least in part on prior communication behavior of the second electronic device.

14. The electronic device of claim 1, wherein the operations comprise:
receiving, at the second interface circuit, a revocation of the authorization to use the channel associated with the server;
providing, from the second interface circuit and based at least in part on the revocation, a second allocation request addressed to the server for a second channel in the band of frequencies; and
receiving, at the second interface circuit, a second allocation response associated with the server, wherein the second allocation response authorizes use of the second channel.

15. A non-transitory computer-readable storage medium for use in conjunction with an electronic device, the computer-readable storage medium storing program instructions that, when executed by the electronic device, cause the electronic device to perform one or more operations comprising:
providing, from an interface circuit that communicates in a network using a wired communication protocol, an allocation request addressed to a server for a channel in a band of frequencies;
receiving, at the interface circuit, an allocation response associated with the server, wherein the allocation response authorizes use of the channel;
attempting to establish, via the interface circuit, a service flow with the network, wherein the service flow has a capacity corresponding the channel;
selectively providing, from the interface circuit and based at least in part on successfully establishing the service flow, a heartbeat message addressed to the server, wherein the heartbeat message indicates that the channel will be used; and
receiving, at the interface circuit, a heartbeat response associated with the server, wherein the heartbeat response approves use of the channel.

16. The non-transitory computer-readable storage medium of claim 15, wherein, prior to providing the allocation request, the operations comprise receiving, at the interface circuit, an instruction associated with a computer in a cellular-telephone network to secure the channel for use in communication with a second electronic device.

17. The non-transitory computer-readable storage medium of claim 16, wherein, after the heartbeat response, the operations comprise establishing, via a second interface circuit that uses a wireless communication protocol in the channel in the band of frequencies, a connection with the second electronic device; and
wherein the connection uses the channel.

18. The non-transitory computer-readable storage medium of claim 15, wherein, prior to providing the allocation request, the operations comprise receiving, at a second interface circuit that uses a wireless communication protocol in the channel in the band of frequencies, a request associated with a second electronic device to secure bandwidth for the second electronic device.

19. A method for establishing communication, comprising:
by an electronic device:
providing, from an interface circuit that communicates in a network using a wired communication protocol, an allocation request addressed to a server for a channel in a band of frequencies;
receiving, at the interface circuit, an allocation response associated with the server, wherein the allocation response authorizes use of the channel;

attempting to establish, via the interface circuit, a service flow with the network, wherein the service flow has a capacity corresponding the channel;

selectively providing, from the interface circuit and based at least in part on successfully establishing the service flow, a heartbeat message addressed to the server, wherein the heartbeat message indicates that the channel will be used; and receiving, at the interface circuit, a heartbeat response associated with the server, wherein the heartbeat response approves use of the channel.

20. The method of claim 19, wherein, prior to providing the allocation request, the method comprises receiving, at the interface circuit, an instruction associated with a computer in a cellular-telephone network to secure the channel for use in communication with a second electronic device.

\* \* \* \* \*